(12) United States Patent
Niaz (10) Patent No.: US 10,502,352 B2
(45) Date of Patent: Dec. 10, 2019

(54) JOINT ASSEMBLY

(71) Applicant: Perkins Engines Company Limited, Peterborough (GB)

(72) Inventor: Naseer Niaz, Peterborough (GB)

(73) Assignee: Perkins Engines Company Limited, s-Hertogenbosch (NL)

( * ) Notice: Subject to any disclaimer, the term of this patent is extended or adjusted under 35 U.S.C. 154(b) by 215 days.

(21) Appl. No.: 15/707,044

(22) Filed: Sep. 18, 2017

(65) Prior Publication Data

US 2018/0094757 A1 Apr. 5, 2018

(51) Int. Cl.
| | |
|---|---|
| *F01N 13/08* | (2010.01) |
| *F16L 19/025* | (2006.01) |
| *F16L 25/14* | (2006.01) |
| *F16L 25/12* | (2006.01) |
| *F01N 3/021* | (2006.01) |
| *F16L 37/10* | (2006.01) |
| *F16L 27/04* | (2006.01) |
| *F16L 9/00* | (2006.01) |
| *F01N 3/10* | (2006.01) |

(Continued)

(52) U.S. Cl.
CPC ............ *F16L 37/101* (2013.01); *F01N 3/021* (2013.01); *F01N 3/103* (2013.01); *F01N 3/106* (2013.01); *F01N 3/2066* (2013.01); *F01N 13/009* (2014.06); *F01N 13/08* (2013.01); *F01N 13/1805* (2013.01); *F01N 13/1816* (2013.01); *F16L 9/006* (2013.01); *F16L 19/025* (2013.01); *F16L 25/12* (2013.01); *F16L 25/14* (2013.01); *F16L 27/044* (2013.01); *F01N 2610/02* (2013.01); *F16L 27/04* (2013.01); *Y02T 10/24* (2013.01)

(58) Field of Classification Search
CPC ....... F16L 27/04; F16L 27/044; F16L 27/053; F16L 27/06
See application file for complete search history.

(56) References Cited

U.S. PATENT DOCUMENTS

| | | | |
|---|---|---|---|
| 881,045 A | 3/1908 | Badger | |
| 3,056,615 A * | 10/1962 | Breitenstein | F16C 11/06 277/507 |

(Continued)

FOREIGN PATENT DOCUMENTS

| | | |
|---|---|---|
| CN | 202144922 U | 2/2012 |
| EP | 0526675 | 2/1993 |

(Continued)

*Primary Examiner* — James M Hewitt, II (57) ABSTRACT

A joint assembly for connecting a first pipe having a first inner diameter and a second pipe having a second inner diameter which is larger than the first inner diameter comprises, an annular section comprising an annular wall defining a flow path through the annular section and configured to connect to the first pipe and the second pipe, and a clamp portion configured to clamp the second pipe between an outer surface of the annular section and an inner surface of the clamp portion. An inner diameter of the annular section varies from a first inner diameter at a first end of the annular section to a second inner diameter at a second end of the annular section. The first inner diameter is substantially equal to the inner diameter of the first pipe. The second inner diameter is substantially equal to the inner diameter of the second pipe.

13 Claims, 7 Drawing Sheets

(51) Int. Cl.
    *F01N 3/20*   (2006.01)
    *F01N 13/18*  (2010.01)
    *F01N 13/00*  (2010.01)

(56) References Cited

U.S. PATENT DOCUMENTS

| | | | |
|---|---|---|---|
| 4,116,477 A | | 9/1978 | Wahoski |
| 4,371,198 A | * | 2/1983 | Martin ............... F16L 11/18 285/145.1 |
| 4,613,170 A | | 9/1986 | Kersting |
| 4,706,455 A | | 11/1987 | Johnsson |
| 4,840,409 A | * | 6/1989 | Welkey ............... F16L 27/053 277/625 |
| 5,683,119 A | * | 11/1997 | Emmons ............. F01N 13/1811 285/146.3 |
| 5,722,461 A | | 3/1998 | Lake |
| 7,788,912 B2 | | 9/2010 | Hartmann |
| 2005/0179260 A1 | | 8/2005 | Sedlacek et al. |
| 2007/0145739 A1 | | 6/2007 | Haberl |
| 2011/0121563 A1 | | 5/2011 | Toyoshima et al. |
| 2012/0085300 A1 | | 4/2012 | Asano et al. |
| 2016/0298798 A1 | * | 10/2016 | Rickards ............. F16L 27/053 |

FOREIGN PATENT DOCUMENTS

| | | | | |
|---|---|---|---|---|
| GB | 2037922 A | | 7/1980 | |
| GB | 2199101 A | * | 6/1988 | ........... F16L 27/053 |
| JP | 2003021283 | | 1/2003 | |
| WO | WO-2008089843 A1 | * | 7/2008 | |
| WO | 2013/050106 A1 | | 4/2013 | |
| WO | 2014/148992 A1 | | 9/2014 | |

\* cited by examiner

JOINT ASSEMBLY

TECHNICAL FIELD

This disclosure is directed to a joint assembly, and in particular to a joint assembly for an aftertreatment system for an internal combustion engine.

BACKGROUND

Engines, for example internal combustion engines burning gasoline, diesel, or biofuel, output various substances which must be treated to meet current and future emissions legislation. Most commonly, such substances comprise hydrocarbons (HC), carbon monoxides (CO), mono-nitrogen oxides (NOx), and particulate matter such as carbon (C), a constituent of soot. Some of those substances may be reduced by careful control of the operating conditions of the engine, but usually it is necessary to provide an aftertreatment module downstream of the engine to treat at least some of the substances entrained in the exhaust gas.

Various apparatus for reducing and/or eliminating constituents in emissions are known. By these methods, engine emissions can be cleaned, meaning that a proportion of the substances which would otherwise be released into the atmosphere are instead converted to carbon dioxide ($CO_2$), nitrogen ($N_2$) and water ($H_2O$).

For example, it is known to provide an oxidation device, such as a diesel oxidation catalyst (DOC), to reduce or to eliminate hydrocarbons (HC) and/or carbon monoxide (CO). Oxidation devices generally include a catalyst to convert those substances into carbon dioxide and water.

As a further example, aftertreatment modules may include filtration devices to restrict the particulates present in the exhaust gas from being output to the atmosphere. The soot collected in the filtration device must later be removed to maintain the efficiency of the filtration device. The methods by which soot may be removed from the filtration device are well known in the art and may generally be referred to as regeneration, which is carried out at elevated temperatures.

In addition, it is known to reduce or eliminate mono-nitrogen oxides (NOx) in diesel combustion emissions by selective catalytic reduction (SCR). In a typical SCR system, urea or a urea-based water solution is mixed with exhaust gas. In some applications, a urea solution is injected directly into an exhaust passage through a specialised injector device. The injected urea solution mixes with exhaust gas and breaks down to provide ammonia ($NH_3$) in the exhaust stream. The ammonia then reacts with nitrogen oxides (NOx) in the exhaust at a catalyst to provide nitrogen gas ($N_2$) and water ($H_2O$).

Such aftertreatment systems are typically modularly packaged, with conduits fluidly connecting sequential modules. It is generally desirable to provide a compact arrangement for the aftertreatment system, in order to minimise the space required for the aftertreatment system within a machine. A compact arrangement for the aftertreatment system may be facilitated by the use of flexible pipes for the conduits; however, such flexible pipework may increase the cost of the aftertreatment system. Rigid pipes are a more cost effective solution, but the use of rigid pipes to interconnect pipes of different sizes usually requires additional transitional pipework, which may increase the overall size of the aftertreatment system. It is therefore challenging to minimise the cost of the aftertreatment system whilst maintaining a compact arrangement.

SUMMARY

The present disclosure provides a joint assembly for connecting a first pipe having a first inner diameter and a second pipe having a second inner diameter which is larger than the first inner diameter, the joint assembly comprising:

an annular section comprising an annular wall defining a flow path through the annular section and configured to connect to the first pipe and to mate with the second pipe; and a clamp portion configured to clamp the second pipe between an outer surface of the annular section and an inner surface of the clamp portion; wherein an inner diameter of the annular section varies in a gradual manner from a first inner diameter at a first end of the annular section to a second inner diameter at a second end of the annular section;

the first inner diameter of the annular section is substantially equal to the inner diameter of the first pipe;

the second inner diameter of the annular section is substantially equal to the inner diameter of the second pipe;

an inner surface of the annular section is tapered between the first end of the annular section and the second end of the annular section; and the annular section is thicker at the first end of the annular section than at the second end of the annular section.

By way of example only, embodiments of a joint assembly are now described with reference to, and as shown in, the accompanying drawings.

DETAILED DESCRIPTION

Figure 1:
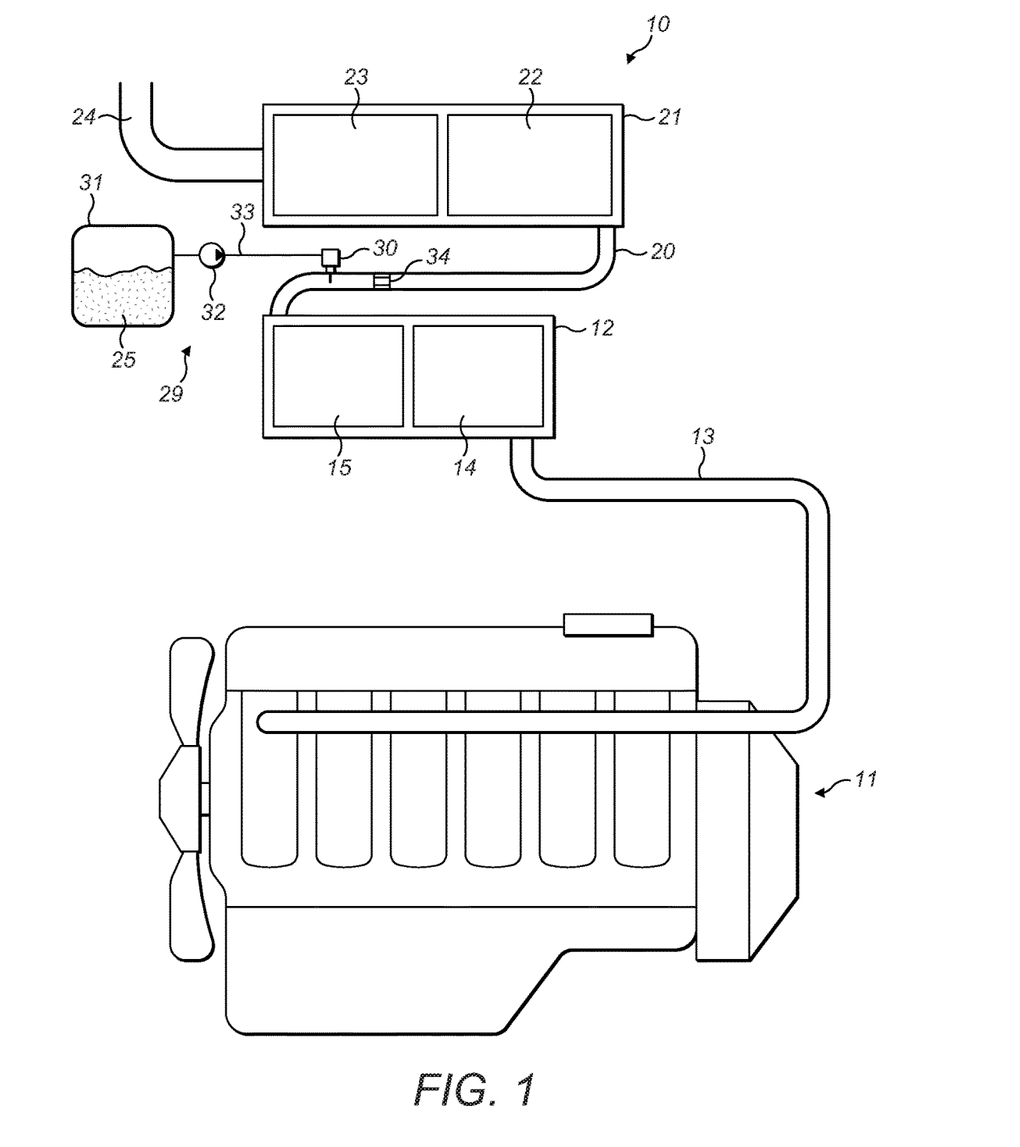
FIG. 1 is a block diagram of a typical exhaust aftertreatment system.

FIG. 1 illustrates a block diagram of a typical exhaust aftertreatment system 10 associated with the engine 11 of a machine (not shown). The term 'machine' is used generically to describe any machine driven by mechanical means by an engine through a transmission. The machine may be a work machine, such as a backhoe loader. The engine 11 may be an internal combustion engine, such as a diesel engine.

The aftertreatment system 10 may be modularly packaged as shown in the illustrated embodiment for retrofit onto existing engines or, alternatively, for installation on new engines. As shown in FIG. 1, the aftertreatment system 10 may include a first module 12 that may be fluidly connected to an exhaust conduit 13 of the engine 11. The first module 12 may contain various exhaust gas treatment devices such as a diesel oxidation catalyst (DOC) 14 and a diesel particulate filter (DPF) 15, but other devices may be used.

A transfer conduit 20 may fluidly interconnect the first module 12 with a second module 21. The second module 21 may enclose an SCR catalyst 22 and an Ammonia Oxidation Catalyst (AMOX) 23. The AMOX 23 may comprise a region of, or a partial coating on, a secondary SCR catalyst. An exhaust outlet 24 may be fluidly connected to the second module 21 such that the exhaust gas that has passed through the second module 21 may be released into the atmosphere.

The SCR catalyst 22 and AMOX 23 may operate to treat exhaust gas from the engine 11 in the presence of ammonia. The ammonia may be provided through degradation of a urea-based water solution 25 (commonly known as diesel exhaust fluid, DEF) injected into the exhaust gas in the transfer conduit 20 by an injector 30. The DEF 25 may meet the ISO22241 standard and comprise from 31.8% to 33.2% urea by weight. A DEF system 29 may be provided, wherein the DEF 25 may be contained within a reservoir 31 and may be provided to the injector 30 by a pump 32, which may be located in a DEF conduit 33 fluidly connecting the reservoir 31 to the injector 30. The pump 32 may pressurise the DEF system 29 to an operating pressure. A typical operating pressure may be 5 bar or 9 bar, but other operating pressures may also be possible, for example less than 5 bar or greater than 9 bar. To promote mixing of DEF 25 with the exhaust gas in the transfer conduit 20, a mixer 34 may be disposed along the transfer conduit 20, downstream of the injector 30.

Figure 2:
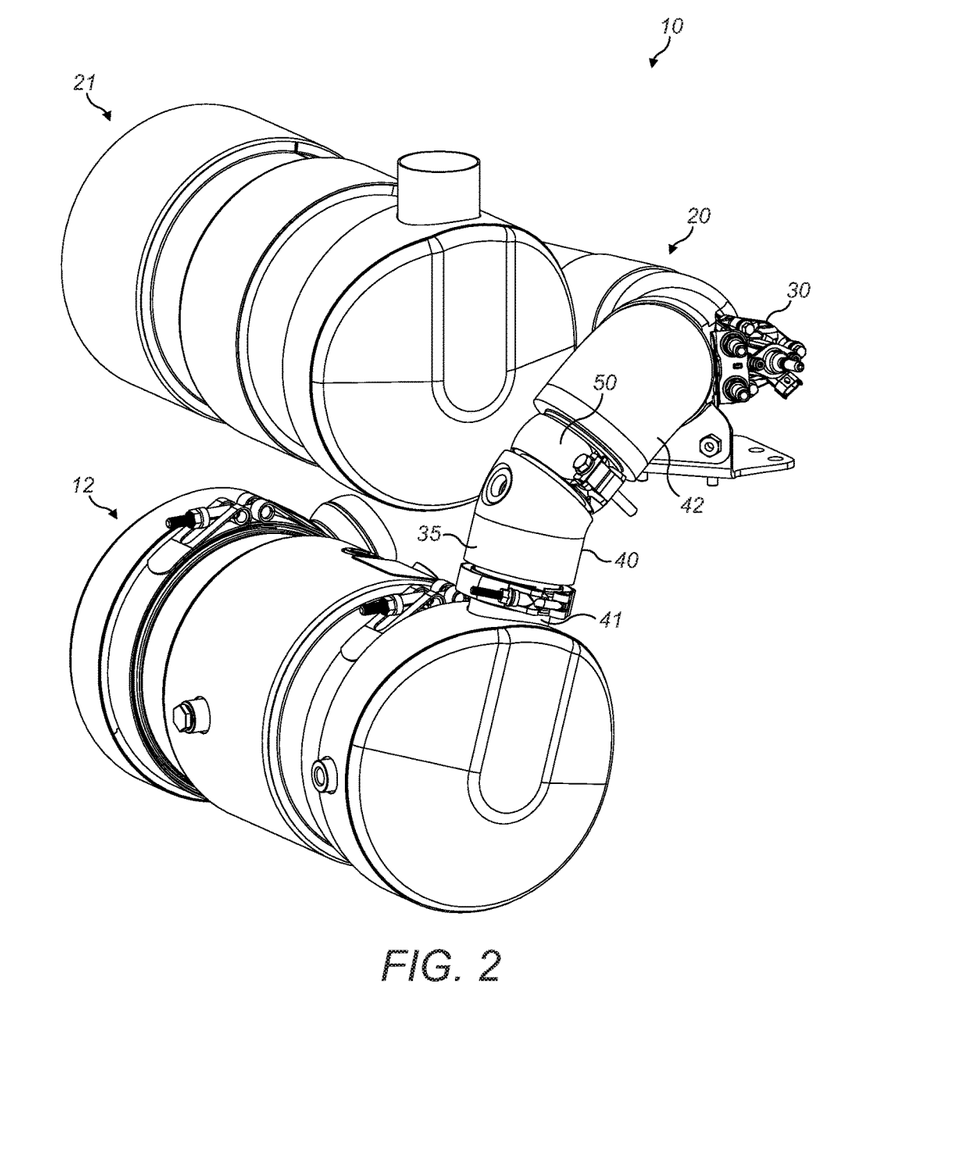
FIG. 2 is a perspective view of an example aftertreatment system having a first embodiment of a joint assembly according to the present disclosure.
Figure 3:
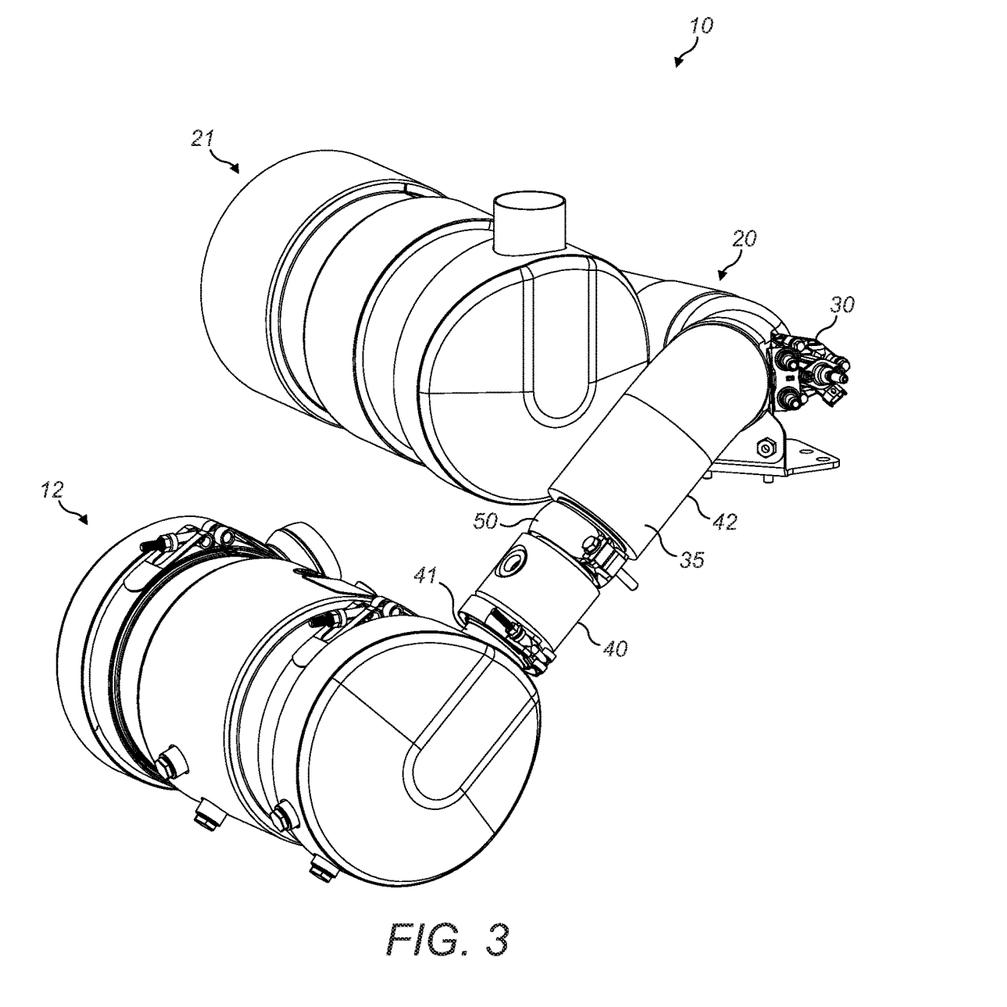
FIG. 3 is a perspective view of a further example aftertreatment system having a first embodiment of a joint assembly according to the present disclosure.

FIGS. 2 and 3 show two example alternative arrangements for the aftertreatment system 10. The first and second modules 12, 21 may be disposed next to one another, with the transfer conduit 20 disposed between them. The first and second modules 12, 21 may be packaged in a stacked arrangement as shown in FIG. 2, or in an offset arrangement as shown in FIG. 3. The transfer conduit 20 may be provided with an external insulation 35. The injector 30 may be disposed along the transfer conduit 20. The aftertreatment system 10 may be packaged such that the position of the injector 30 is relatively external to the surrounding structures and thus may be exposed to a convective cooling air flow.

Figure 4:
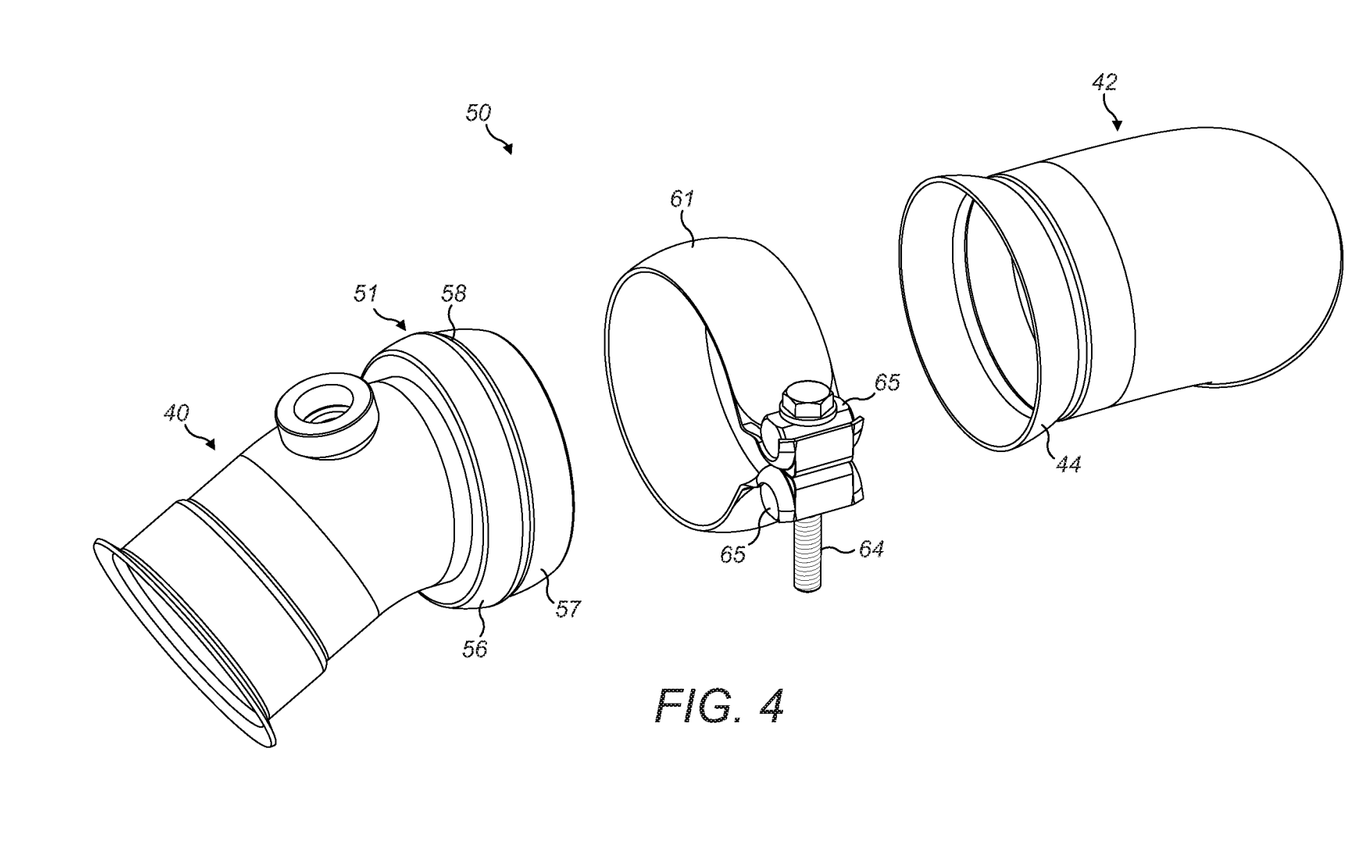
FIG. 4 is an exploded perspective view of an embodiment of a joint assembly according to the present disclosure.
Figure 5:
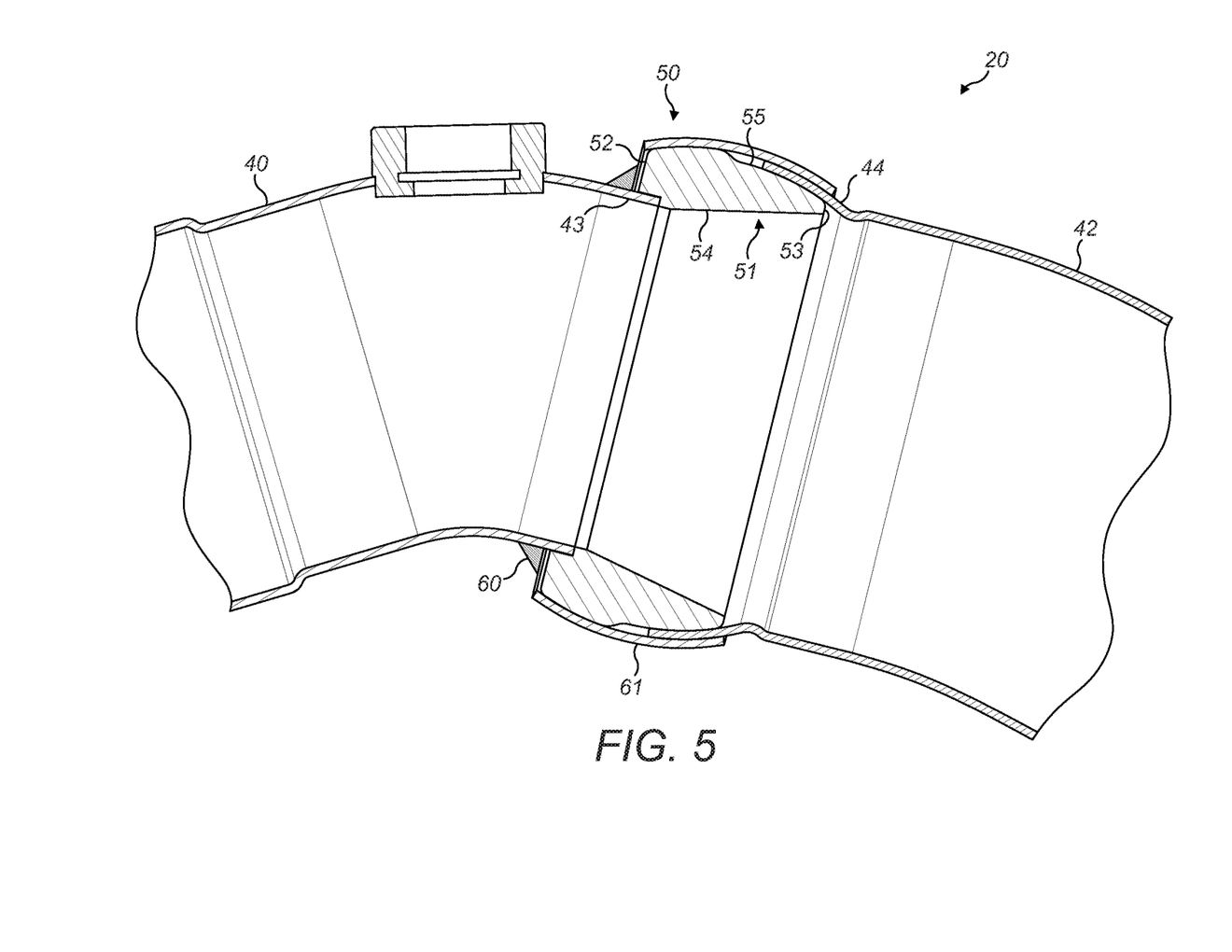
FIG. 5 is a cross-sectional view of the joint assembly of FIG. 4.

The transfer conduit 20 may comprise two or more rigid pipes, which may be interconnected. For example, as shown in FIGS. 4 and 5, the transfer conduit 20 may comprise a first pipe 40 and a second pipe 42. The first pipe 40 may be fluidly connected to and sized to fit an outlet 41 from the first module 12, and the second pipe 42 may be fluidly connected to and sized to fit an inlet (not shown) to the second module 21. An inner diameter of the second pipe 42 may be larger than an inner diameter of the first pipe 40. As a non-limiting example, the first pipe 40 may have an inner diameter of substantially 60.5 mm, and the second pipe 42 may have an inner diameter of 71.5 mm. A joint assembly 50 may be provided to interconnect the first pipe 40 and the second pipe 42.

The joint assembly 50 may comprise an annular portion (or "section") 51 (shown in greater detail in FIG. 6) for connection to the first pipe 40. The annular portion 51 may comprise an annular wall, which may define a flow path through the annular portion 51. The annular portion 51 may have an inner diameter which may vary in a gradual manner from a first inner diameter at a first end 52 of the annular portion 51 to a second inner diameter at a second end 53 of the annular portion 51, such that an inner surface 54 of the annular portion 51 may be tapered. For example, the inner diameter of the annular portion 51 may vary in a linear manner from the first inner diameter at the first end 52 of the annular portion 51 to the second inner diameter at the second end 53 of the annular portion 51. Alternatively, the inner diameter of the annular portion 51 may vary in a non-linear manner. The second inner diameter may be larger than the first inner diameter. The first inner diameter may be substantially equal to an inner diameter of the first pipe 40, and the second inner diameter may be substantially equal to an inner diameter of the second pipe 42. The annular portion 51 may have a length of 25.9 mm.

Figure 6:
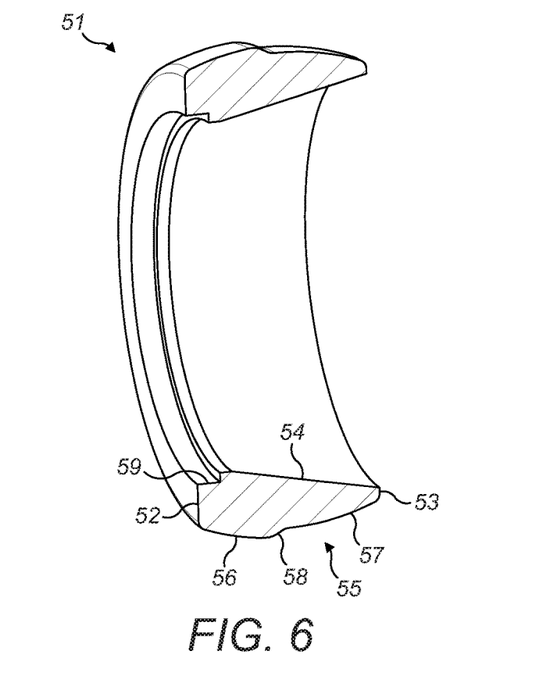
FIG. 6 is a cut-away perspective view of an annular portion of the joint assembly of FIGS. 4 and 5.

An outer surface 55 of the annular portion 51 may have a stepped arced profile, wherein a first arc 56 may be provided adjacent the first end 52 and a second arc 57 may be provided adjacent the second end 53. The first and second arcs 56, 57 may be co-axial, with the first arc 56 having a first radius and the second arc 57 having a second radius, wherein the radius of the first arc 56 may be larger than the radius of the second arc 57 such that an outer diameter of the annular portion 51 is larger in the region of the first arc 56 than in the region of the second arc 57. An arc transition portion 58 may be provided between the first and second arcs 56, 57. The difference between the radius of the first arc 56 and the radius of the second arc 57 may be equal to the thickness of the second pipe 42. The end portion 44 of the second pipe 42 may be shaped and dimensioned to fit over the second arc 57, such that an inner surface of the end portion 44 of the second pipe 42 has a complimentary profile to the second arc 57.

Figure 7:
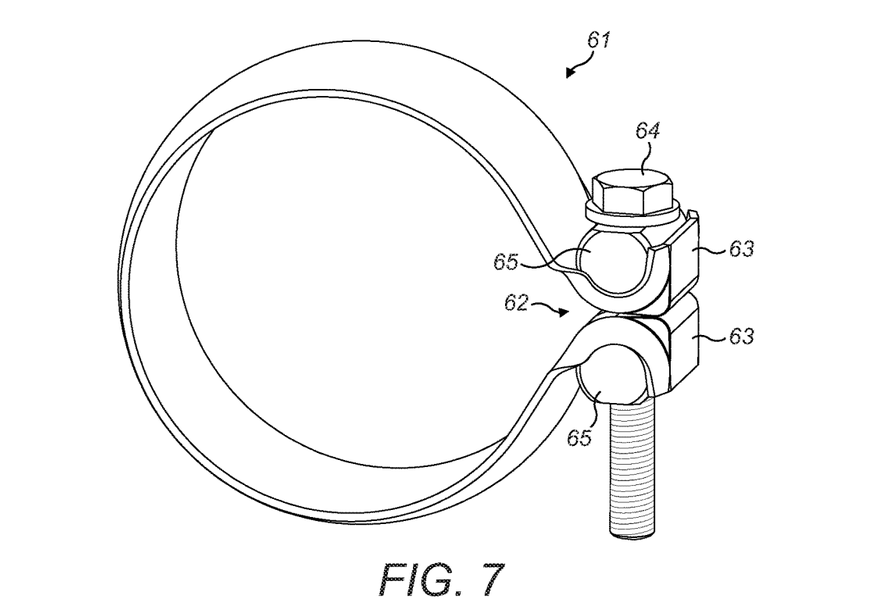
FIG. 7 is a perspective view of a clamp portion of the joint assembly of FIGS. 4 and 5.

The joint assembly 50 may further comprise a clamp portion 61 (shown in greater detail in FIG. 7). The clamp portion 61 may be generally annular, with an opening region 62. Externally protruding opposing flanges 63 comprising apertures (not shown) may be provided at the opening region 62, such that the clamp portion 61 may be closed and secured using a bolt 64 and threaded trunnions 65.

The clamp portion 61 may generally have a frusto-spherical profile. A frusto-spherical profile may be defined as a spherical profile delimited by two parallel planes, such that the spherical profile is truncated at two opposing ends, wherein the two parallel planes are preferably equally spaced from a parallel plane at the centre of the sphere. The frusto-spherical profile may be co-axial with the first and second arcs 56, 57.

The first and second pipes 40, 42, annular portion 51, clamp portion 61, and weld joint 60 may be manufactured from any suitable material, such as stainless steel. As a non-limiting example, stainless steel grade 441 or grade 304 may be used for any of the components. Preferably, the materials used for the components of the joint assembly 50 and first and second pipes 40, 42 may have a similar coefficient of thermal expansion, in order to minimise thermal stresses.

Figure 8:
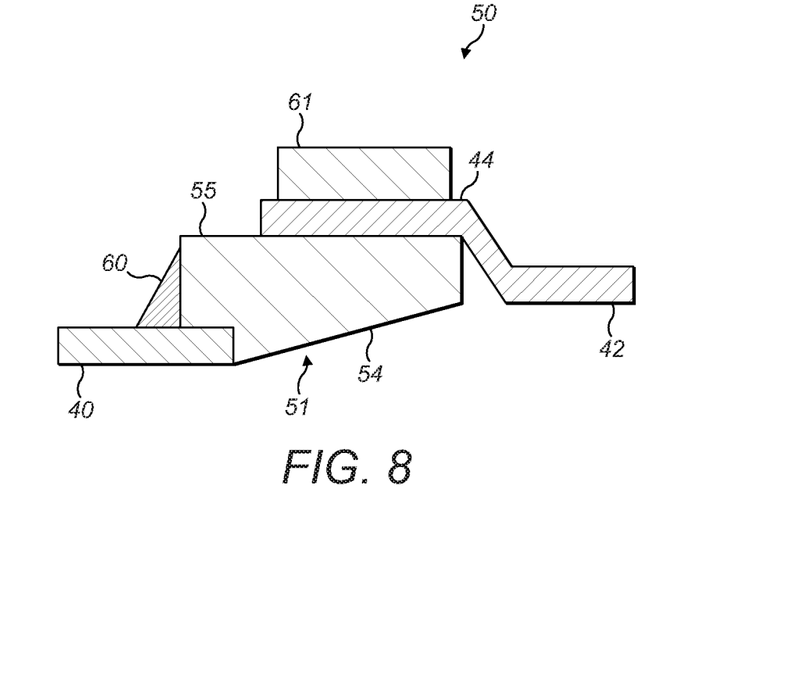
FIGS. 8 and 9 are schematic views of alternative embodiments of a joint assembly according to the present disclosure.

In an alternative embodiment of the joint assembly 50 (shown in FIG. 8), the outer surface 55 of the annular portion 51 may have a level profile, with the end portion 44 of the second pipe 42 being shaped and dimensioned to fit over the level outer surface 55. The clamp portion 61 in this embodiment may comprise a flat band clamp.

Figure 9:
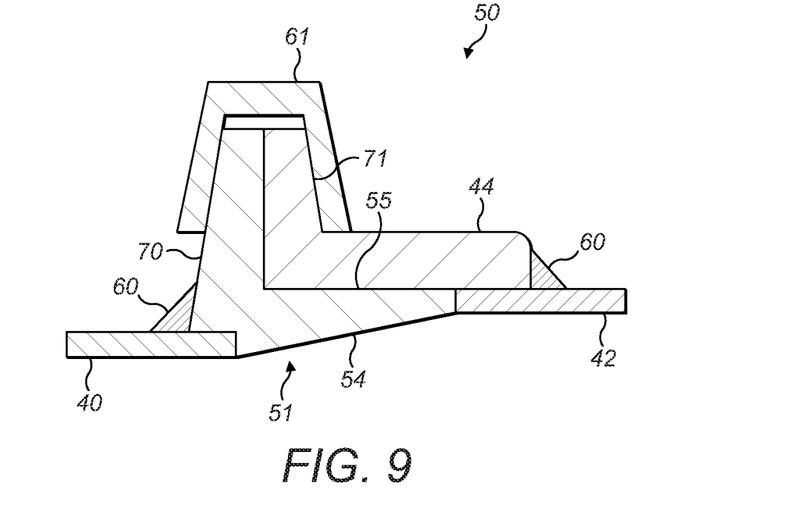

In a further alternative embodiment of the joint assembly 50 (shown in FIG. 9), the outer surface 55 of the annular portion 51 may comprise a first radial protrusion 70. In this embodiment, the end portion 44 of the second pipe 42 may comprise an extension component welded, or otherwise suitably joined, to the second pipe 42. The extension component may comprise a second radial protrusion 71 which may be complementary to the first radial protrusion 70. The clamp portion 61 may comprise a V-band clamp, which may fit over the first and second protrusions 70, 71.

INDUSTRIAL APPLICABILITY

The joint has industrial applicability in the field of internal combustion engines, and particularly in the field of aftertreatment systems.

To assemble the joint assembly 50, the first end 52 of the annular portion 51 may be connected to the end portion 43 of the first pipe 40. To aid location and mating of the end portion 43 of the first pipe 40 with the annular portion 51, an internal shoulder 59 having a thickness substantially equal to the thickness of the first pipe 40 may be provided in the inner surface 54 at the first end 52 of the annular portion 51. A weld joint 60 may be provided to secure the annular portion 51 to the end portion 43 of the first pipe 40. The internal shoulder 59 may increase the strength of the joint between the annular portion 51 and the first pipe 40 and may facilitate a very smooth transition between the two components. In an alternative embodiment, the internal shoulder 59 may not be provided, and the end portion 43 of the first pipe 40 may instead abut the first end 52 of the annular portion 51, again being secured by a weld joint 60.

The end portion 44 of the second pipe 42 may then be fitted over the second end 53 of the annular portion 51, in the region of the second arc 57. The clamp portion 61 may subsequently be fitted over the annular portion 51 and the end portion 44 of the second pipe 42, and secured using the bolt 64 and trunnions 65. Thus the outer surface 55 of the annular portion 51 in the region of the second arc 57 and the inner surface of the clamp portion 61 together provide a blind channel within which the end portion 44 of the second pipe 42 is received.

The tapered inner surface 54 of the annular portion 51 may provide a smooth transition between the inner diameter of the first pipe 40 and the inner diameter of the second pipe 42. This may avoid flow separation of the exhaust gases flowing from the first pipe 40 to the second pipe 42. Conversely, an abrupt change in diameter between the first and second pipes 40, 42 may result in eddies and flow recirculation, which may result in poor flow performance.

By providing a smooth transition between the inner diameter of the first pipe 40 and the inner diameter of the second pipe 42 as part of the joint assembly 50, i.e. at the joint between the first and second pipes 40, 42, the need for additional transitional pipework to effect a smooth transition is obviated, and therefore the aftertreatment system 10 may be more compact.

By providing the outer surface 55 of the annular portion 51 with a stepped arced profile and shaping and dimensioning the end portion 44 of the second pipe 42 to fit over the second arc 57 of the outer surface 55 of the annular portion 51, the joint assembly 50 may additionally function as a ball-joint. In doing so, the joint assembly 50 may take up rotational tolerance when assembling the aftertreatment system 10. The joint assembly 50 may preferably provide a rotational freedom between the first and second pipes 40, 42 of up to ±5° inclusive, preferably ±3° inclusive, about any axis perpendicular to a central longitudinal axis of the second pipe 42. Subsequently securing the clamp portion 61 via the bolt 64 and trunnions 65 causes the relative positions of first and second pipes 40, 42 to be fixed, and further movement is prevented.

As noted, in the above-described arrangement the first pipe 40 may be fluidly connected to and sized to fit an outlet 41 from the first module 12, and the second pipe 42 may be fluidly connected to and sized to fit an inlet (not shown) to the second module 21. However, it will be clear to the skilled person that the disclosure may alternatively be implemented where the first and second pipes 40, 42 are oppositely arranged, such that the first pipe 40 is fluidly connected to and sized to fit the inlet (not shown) to the second module 21, and the second pipe 42 is be fluidly connected to and sized to fit an outlet 41 from the first module 12. Indeed, the disclosure may be applied to any arrangement having first and second pipes 40, 42 where an inner diameter of the second pipe 42 is larger than an inner diameter of the first pipe 40.

The invention claimed is:

1. A joint assembly for connecting a first pipe having a first inner diameter and a second pipe having a second inner diameter which is larger than the first inner diameter, the joint assembly comprising:
    an annular section comprising an annular wall defining a flow path through the annular section and configured to connect to the first pipe and to mate with the second pipe; and
    a clamp portion configured to clamp the second pipe between an outer surface of the annular section and an inner surface of the clamp portion; wherein
        an inner diameter of the annular section varies in a gradual manner from a first inner diameter at a first end of the annular section to a second inner diameter at a second end of the annular section;
        the first inner diameter of the annular section is substantially equal to the inner diameter of the first pipe;
        the second inner diameter of the annular section is substantially equal to the inner diameter of the second pipe;
        an inner surface of the annular section is tapered between the first end of the annular section and the second end of the annular section;
        the annular section is thicker at the first end of the annular section than at the second end of the annular section; and
    wherein an outer surface of the annular section has a stepped arced profile, comprising a first arc having a first radius adjacent the first end and a second arc having a second radius adjacent the second end, with a transition portion therebetween, and wherein the difference between the radius of the first arc and the radius of the second arc is equal to a thickness of the second pipe.

2. A joint assembly according to claim 1, wherein the inner diameter of the annular section varies in a linear manner.

3. A joint assembly according to claim 1, wherein the inner diameter of the annular section varies in a non-linear manner.

4. A joint assembly according to claim 1, wherein at the second end of the annular section the outer surface of the annular section and the inner surface of the clamp portion are configured to provide an annular blind channel therebetween for receipt of the second pipe.

5. A joint assembly according to claim 1, wherein the first and second arcs are co-axial.

6. A joint assembly according to claim 1, wherein the radius of the first arc is larger than the radius of the second arc.

7. A joint assembly according to claim 1, wherein at the second end of the annular section the outer surface of the annular section and the inner surface of the clamp portion are configured to provide an annular blind channel therebetween for receipt of the second pipe and wherein the annular blind channel is located between the outer surface of the annular section in a region of the second arc and the inner surface of the clamp portion.

8. A joint assembly according to claim 1, wherein the clamp portion has a frusto-spherical profile.

9. A joint assembly according to claim 1, wherein the inner surface of the annular section comprises an internal shoulder at the first end of the annular section.

10. A joint assembly according to claim 1, wherein in the tapered inner surface of the annular section provides for substantially smooth flow of a fluid flowing through the joint assembly.

11. A compound pipe arrangement comprising:
a joint assembly for connecting a first pipe having a first inner diameter and a second pipe having a second inner diameter which is larger than the first inner diameter, the joint assembly including:
an annular section comprising an annular wall defining a flow path through the annular section and configured to connect to the first pipe and to mate with the second pipe; and
a clamp portion configured to clamp the second pipe between an outer surface of the annular section and an inner surface of the clamp portion; wherein
an inner diameter of the annular section varies in a gradual manner from a first inner diameter at a first end of the annular section to a second inner diameter at a second end of the annular section;
the first inner diameter of the annular section is substantially equal to the inner diameter of the first pipe;
the second inner diameter of the annular section is substantially equal to the inner diameter of the second pipe;
an inner surface of the annular section is tapered between the first end of the annular section and the second end of the annular section;
the annular section is thicker at the first end of the annular section than at the second end of the annular section; wherein
the joint assembly and the second pipe together comprise a ball joint formed by the outer surface of the annular section and an end portion of the second pipe; and
wherein an outer surface of the annular section has a stepped arced profile, comprising a first arc having a first radius adjacent the first end and a second arc having a second radius adjacent the second end, with a transition portion therebetween, and wherein the difference between the radius of the first arc and the radius of the second arc is equal to a thickness of the second pipe.

12. A compound pipe arrangement according to claim 11 wherein the inner diameter of the annular section varies in a non-linear manner, and wherein the end portion of the second pipe is shaped and dimensioned to fit over the second arc.

13. A compound pipe arrangement according to claim 11, further comprising the first pipe, wherein the inner surface of the annular section comprises an internal shoulder at the first end of the annular section and the internal shoulder has a thickness substantially equal to a thickness of the first pipe.

* * * * *